United States Patent
Haginaka

(10) Patent No.: US 10,983,734 B2
(45) Date of Patent: Apr. 20, 2021

(54) IMAGE PROCESSING SYSTEM WITH INDEPENDENTLY CHANGEABLE MODULES FOR GENERATING AN IMAGE TO BE PRINTED AND FOR RECEIVING PRINT SETTINGS

(71) Applicant: FUJI XEROX CO., LTD., Tokyo (JP)

(72) Inventor: Takanori Haginaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/547,652

(22) Filed: Aug. 22, 2019

(65) Prior Publication Data

US 2020/0293747 A1 Sep. 17, 2020

(30) Foreign Application Priority Data

Mar. 15, 2019 (JP) .............................. JP2019-048814

(51) Int. Cl.
*G06F 3/12* (2006.01)
(52) U.S. Cl.
CPC .......... *G06F 3/1205* (2013.01); *G06F 3/1203* (2013.01); *G06F 3/1204* (2013.01); *G06F 3/1285* (2013.01)
(58) Field of Classification Search
None
See application file for complete search history.

(56) References Cited

U.S. PATENT DOCUMENTS

2009/0190166 A1* 7/2009 Nakamura ............ G06F 3/1219
358/1.15

FOREIGN PATENT DOCUMENTS

| JP | 3772517 | * | 5/2006 |
| JP | 2012-168814 A | | 9/2012 |

\* cited by examiner

*Primary Examiner* — Barbara D Reinier
(74) *Attorney, Agent, or Firm* — Oliff PLC

(57) ABSTRACT

An image processing system includes an information processing apparatus and an image processing apparatus, in which the information processing apparatus includes: a first output section that outputs, to the image processing apparatus, identification information and an image to be printed; and a second output section that receives print settings from a user and outputs the print settings and the identification information to the image processing apparatus, and the image processing apparatus includes a printing section that receives the image, the print settings, and the identification information output from the first output section and the second output section and performs printing of the image in accordance with the print settings for the image using the identification information.

5 Claims, 12 Drawing Sheets

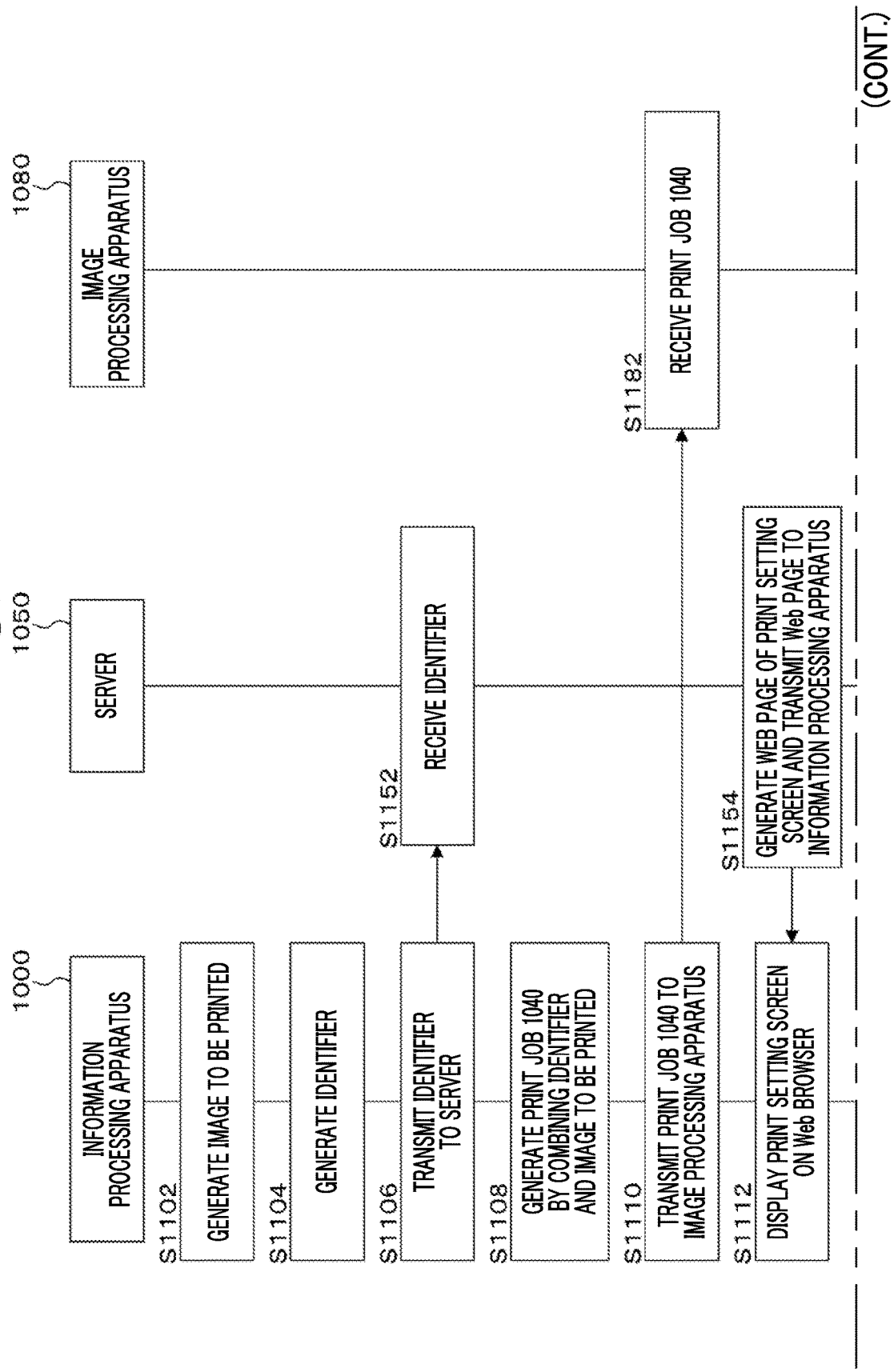

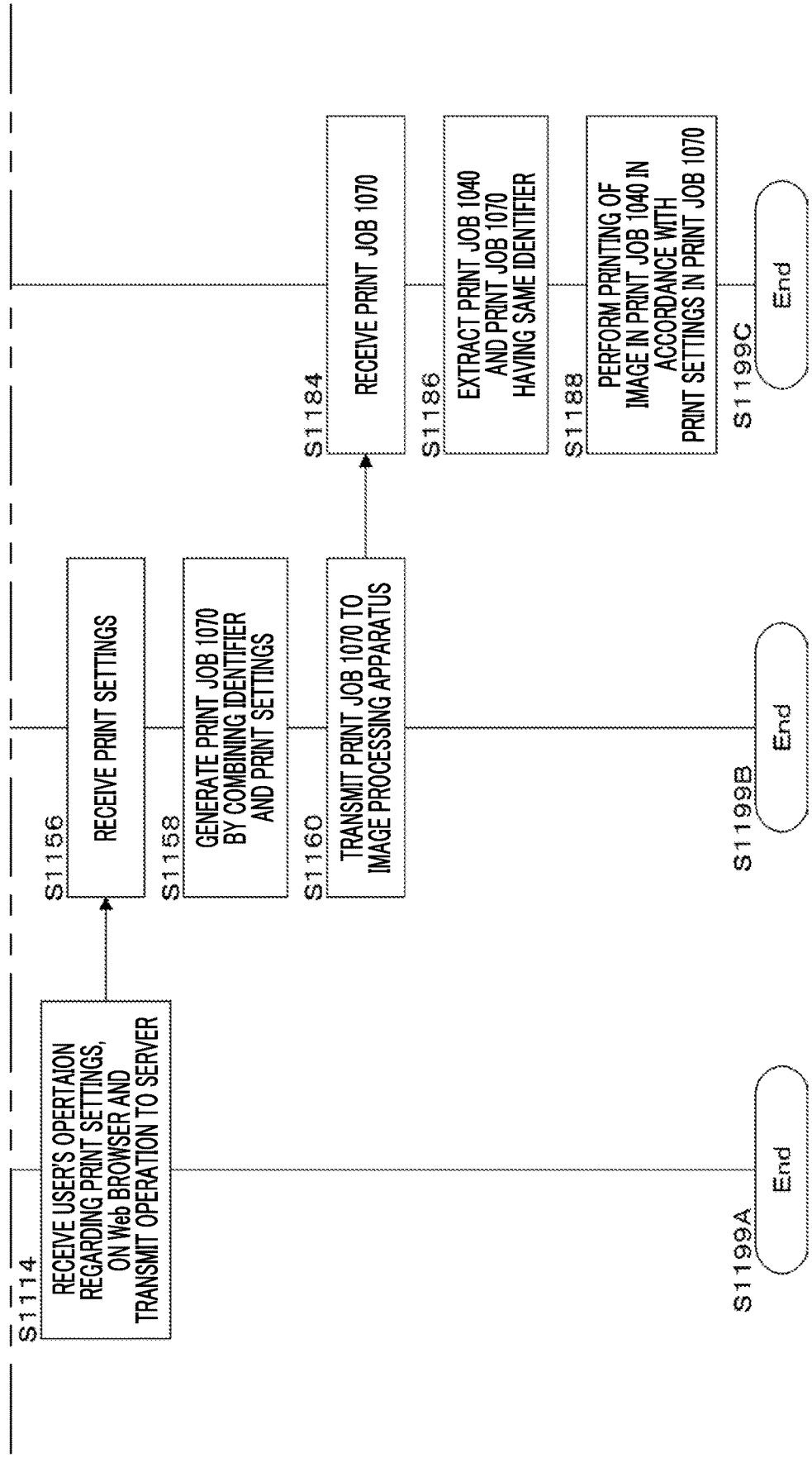

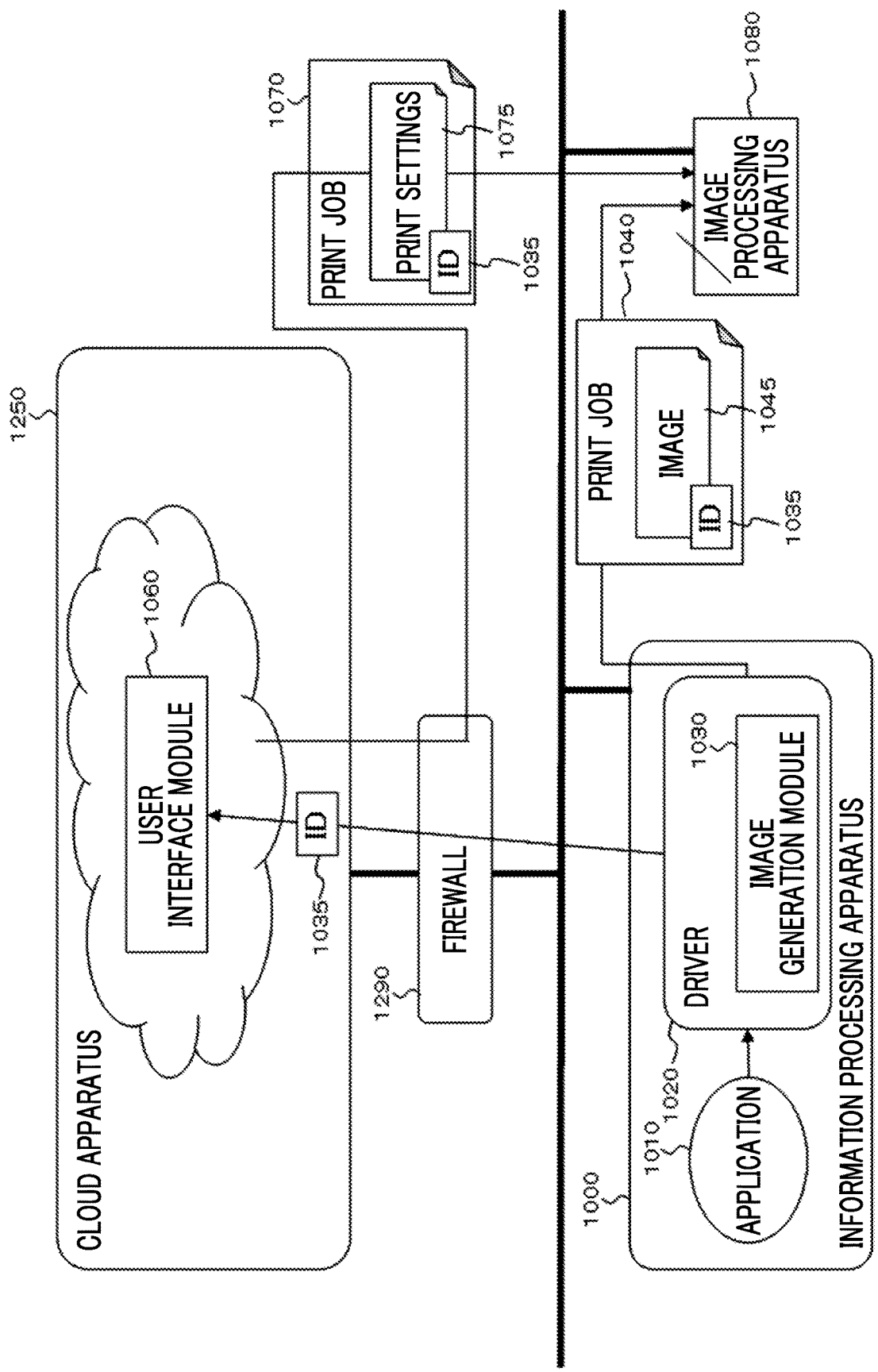

IMAGE PROCESSING SYSTEM WITH INDEPENDENTLY CHANGEABLE MODULES FOR GENERATING AN IMAGE TO BE PRINTED AND FOR RECEIVING PRINT SETTINGS

CROSS-REFERENCE TO RELATED APPLICATIONS

This application is based on and claims priority under 35 USC 119 from Japanese Patent Application No. 2019-048814 filed Mar. 15, 2019.

BACKGROUND

(i) Technical Field

The present disclosure relates to an image processing system.

(ii) Related Art

JP-A-2012-168814 discloses as follows. An object is that a tandem device is capable of printing by operating with cooperation of plural printer drivers as a tandem driver. If the printer driver is determined to be the tandem device, a printer driver for a connected device is called, and printing is performed in cooperation with the called printer driver as a printer driver for a tandem system.

The printer driver has both a section configured to generate an image to be printed and a section configured to receive print settings from the user. For example, even in a case where it is desired to change only the means for receiving the print settings when the printer driver is updated, it is necessary to change the entirety of the printer driver.

SUMMARY

Aspects of non-limiting embodiments of the present disclosure relate to providing an image processing system which includes an information processing apparatus and an image processing apparatus and in which a module configured to generate an image to be printed by the information processing apparatus and a module configured to receive print settings from the user can be changed independently.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an image processing system including: an information processing apparatus; and an image processing apparatus, the information processing apparatus including: a first output section that outputs, to the image processing apparatus, identification information and an image to be printed; and a second output section that receives print settings from a user and outputs the print settings and the identification information to the image processing apparatus, the image processing apparatus including: a printing section that receives the image, the print settings, and the identification information output from the first output section and the second output section and performs printing of the image in accordance with the print settings for the image using the identification information.

BRIEF DESCRIPTION OF THE DRAWINGS

Exemplary embodiments of the present invention will be described in detail based on the following figures, wherein:

FIG. 11 is a flowchart illustrating a processing example in the second exemplary embodiment;

FIG. 12 is a diagram illustrating a printing processing example according to a modification example of the second exemplary embodiment.

DETAILED DESCRIPTION

Hereinafter, examples of various exemplary embodiments for realizing the present disclosure will be described with reference to the drawings.

Figure 1:
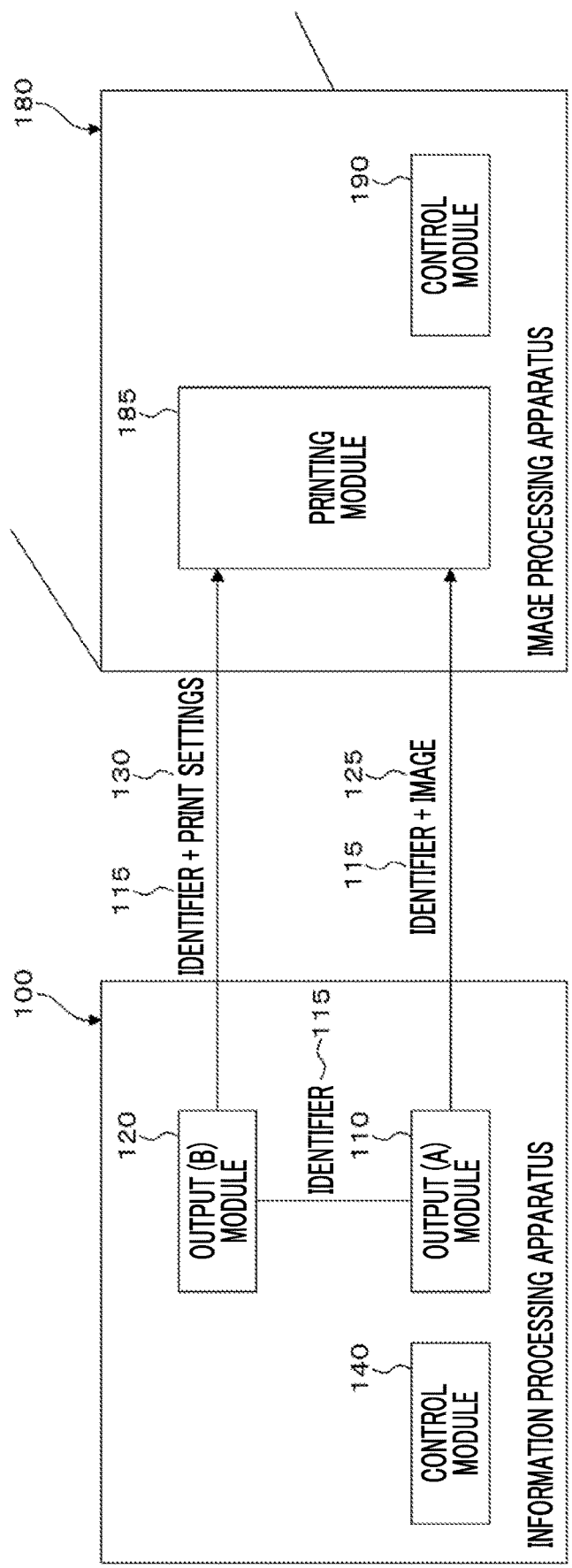
FIG. 1 is a conceptual module configuration diagram illustrating a configuration example according to a first exemplary embodiment.

FIG. 1 is a conceptual module configuration diagram illustrating a configuration example according to a first exemplary embodiment.

A module refers to a component in a form of software that can generally be logically separated (including a computer program as an interpretation of "software"), hardware, and the like. Thus, the module in the exemplary embodiment refers to not only a module in a computer program but also a module in a hardware configuration. Thus, in the exemplary embodiment, a computer program, a system, and a method for causing the computer to function as modules (for example, a program for causing a computer to execute each procedure, a program for causing a computer to function as each section, a computer for causing a computer to realize each function) will be described together. For easy descriptions, "store", "causing storing", and equivalent terms are used. However, in a case where the exemplary embodiment is a computer program, the terms have the meaning of performing control to be stored by a storage device. The modules may correspond to the functions one to one. However, in mounting, one module may include one program, or plural modules may include one program. Conversely, one module may include plural programs. Plural modules may be implemented by one computer, or one module may be implemented by plural computers in a distributed or parallel environment. One module may include another module. In the following descriptions, "connection" is used not only for physical connection but also for logical connection (for example, exchange of data, instruction, reference relationship between pieces of data, and log-in). The term "predetermined" means being determined before target processing and means being determined before processing according to the exemplary embodiment is performed. In addition, the term "predetermined" is used with the meaning that, so long as a time point is before the target processing even though the processing according to the exemplary embodiment has started, it is determined in accordance with a situation or a state at this time or until this time. In a case where plural "predetermined values" is provided, the predetermined values may be different from each other, or two values or more ("two values or more" includes all values) may be equal to each other. The description of "to perform B in a case of A" is used in the meaning of "determining whether or not to be A and performing B in a case where it is determined to be A". A case where determination of whether it is A or not is unnecessary is excluded. In a case where things are listed like "A, B, and C", these are examples unless there is a notice, and this case includes a case of selecting only one (for example, only A).

A system or an apparatus may be configured in a manner that plural computers, devices, and the like and plural pieces of hardware are connected to each other by communication means such as a network ("network" includes a one-to-one communication connection) and may include a case of being realized by one computer, one piece of hardware, one device, and the like. The terms "apparatus" and "system" are used interchangeably. The "system" does not include just a social system which is an artificial arrangement.

Target information is read from a storage device, processing is performed, and then a processing result is written in the storage device, for each piece of processing by each module, or for each piece of processing in a case where plural pieces of processing are performed in one module. Thus, descriptions of reading from the storage device before processing and writing into the storage device after the processing may not be repeated. Here, the storage device may include a hard disk drive, a random access memory (RAM), an external storage medium, a storage device via a communication line, a register in a central processing unit (CPU), and the like.

An information processing apparatus 100 according to a first exemplary embodiment and an image processing system including an image processing apparatus 180 have a printing function. The image processing apparatus 180 performs printing in accordance with a print instruction from the information processing apparatus 100.

The information processing apparatus 100 includes an output (A) module 110, an output (B) module 120, and a control module 140. The information processing apparatus 100 transmits a print instruction to the image processing apparatus 180. For example, a personal computer or a portable information communication device (including a portable telephone, a smartphone, a mobile device, a wearable computer, and the like as the portable information communication device) used by a user is provided as the information processing apparatus 100.

The output (A) module 110 is connected to the output (B) module 120 and a printing module 185 of the image processing apparatus 180. The output (A) module 110 outputs an image 125 to be printed and an identifier 115 to the image processing apparatus 180. The identifier 115 is an example of identification information. For example, an image 125 printable from a document by the image processing apparatus 180 is generated in accordance with a print instruction by user's operation. Generally, rendering processing is provided, and a print image formed of pixels is created. The identifier 115 may be information for causing the image 125 to correspond to print settings 130 transmitted to the image processing apparatus 180 by the output (B) module 120. For example, the identifier 115 may be a sequential number, be information allowing identifying the image 125 (specifically, the name of a document as a print target), or be a hash value of the document or the image 125 as the print target.

The output (B) module 120 is connected to the output (A) module 110 and the printing module 185 of the image processing apparatus 180. The output (B) module 120 receives print settings from a user and outputs the print settings 130 and the identifier 115 to the image processing apparatus 180. The identifier 115 is received from the output (A) module 110. The print settings refer to information necessary when the image processing apparatus 180 performs printing of the image 125 generated by the output (A) module 110. Generally, the print settings are made by user's operation every time a print instruction is issued. For example, the print settings 130 include the sheet size, the number of copies, the enlargement/reduction ratio, and the necessity and setting of post-processing such as stapler processing.

The control module 140 performs control to urge the user to perform print settings corresponding to the identifier 115 output from the output (A) module 110 when there is no output from the output (B) module 120 even though a predetermined period has elapsed from when the output (A) module 110 has performed output.

The term "when there is no output from the output (B) module 120" is intended to include a case where "there is no output of a combination of the identifier 115 and the print settings 130" corresponding to the identifier 115 for "a combination of the identifier 115 and the image 125" output already from the output (A) module 110.

"To urge the user" may mean to let the user be aware of need for print settings, which includes, for example, a process of displaying a message indicating that on a display device such as a liquid crystal display. The process to urge the user may also include a three-dimensional (3D) video output, a sound output from an audio output device such as a speaker, vibration, printing by a printing device such as a printer, or any combinations thereof.

The image processing apparatus 180 includes the printing module 185 and a control module 190. The image processing apparatus 180 is an apparatus that performs printing in accordance with a print instruction from the information processing apparatus 100. For example, a printer and a multifunction device (multifunction device refers to an image processing apparatus having any two or more functions of a scanner, a printer, a copier, a facsimile, and the like) may be provided as the image processing apparatus 180.

The printing module 185 is connected to the output (A) module 110 and the output (B) module 120 of the information processing apparatus 100. The printing module 185 receives the image 125, the print settings 130, and the identifier 115 output from the output (A) module 110 and the output (B) module 120 of the information processing apparatus 100 and performs printing of the image 125 in accordance with the print settings 130 corresponding to the image 125, by the identifier 115. Specifically, the printing module 185 receives a combination of the identifier 115 and the image 125 from the output (A) module 110 of the information processing apparatus 100 and receives a combination of the identifier 115 and the print settings 130 from the output (B) module 120 of the information processing apparatus 100. The printing module 185 extracts the combination having the identifier 115 which has been received from the output (A) module 110 and coincides with the identifier 115 received from the output (B) module 120, and performs printing of the image 125 in accordance with the print settings 130. That is, the image 125 and the print settings 130 to which the same identifier 115 is added are combined (generally, referred to as merging), and printing of the image 125 is performed in accordance with the print settings 130.

The control module 190 deletes the received image 125 and the received identifier 115, when the print settings 130 and the identifier 115 to be output from the output (B) module 120 of the information processing apparatus 100 are not received even though a predetermined period has elapsed from when the image 125 and the identifier 115 output from the output (A) module 110 of the information processing apparatus 100 have been received.

The term "when the print settings 130 and the identifier 115 to be output from the output (B) module 120 are not received" is intended to include a case where "the combination of the identifier 115 and the print settings 130", which corresponds to the identifier 115 in "the combination of the identifier 115 and the image 125" received already from the output (A) module 110 is not received.

"The image 125 and the identifier 115" as deletion targets correspond to "the combination of the image 125 and the identifier 115 received already from the information processing apparatus 100.

The output (A) module 110 and the output (B) module 120 are separate modules. Even when one module is upgraded, upgrading the other module is not required.

In particular, only the output (A) module 110 may be used as the printer driver, and the output (B) module 120 may be excluded from the printer driver. For example, the output (B) module 120 may be realized by an application program. With such a configuration, even when a program of performing processing of performing print settings is upgraded, it is sufficient to reinstall only the output (B) module 120, and thus it can be unnecessary to reinstall the printer driver.

Figure 2:
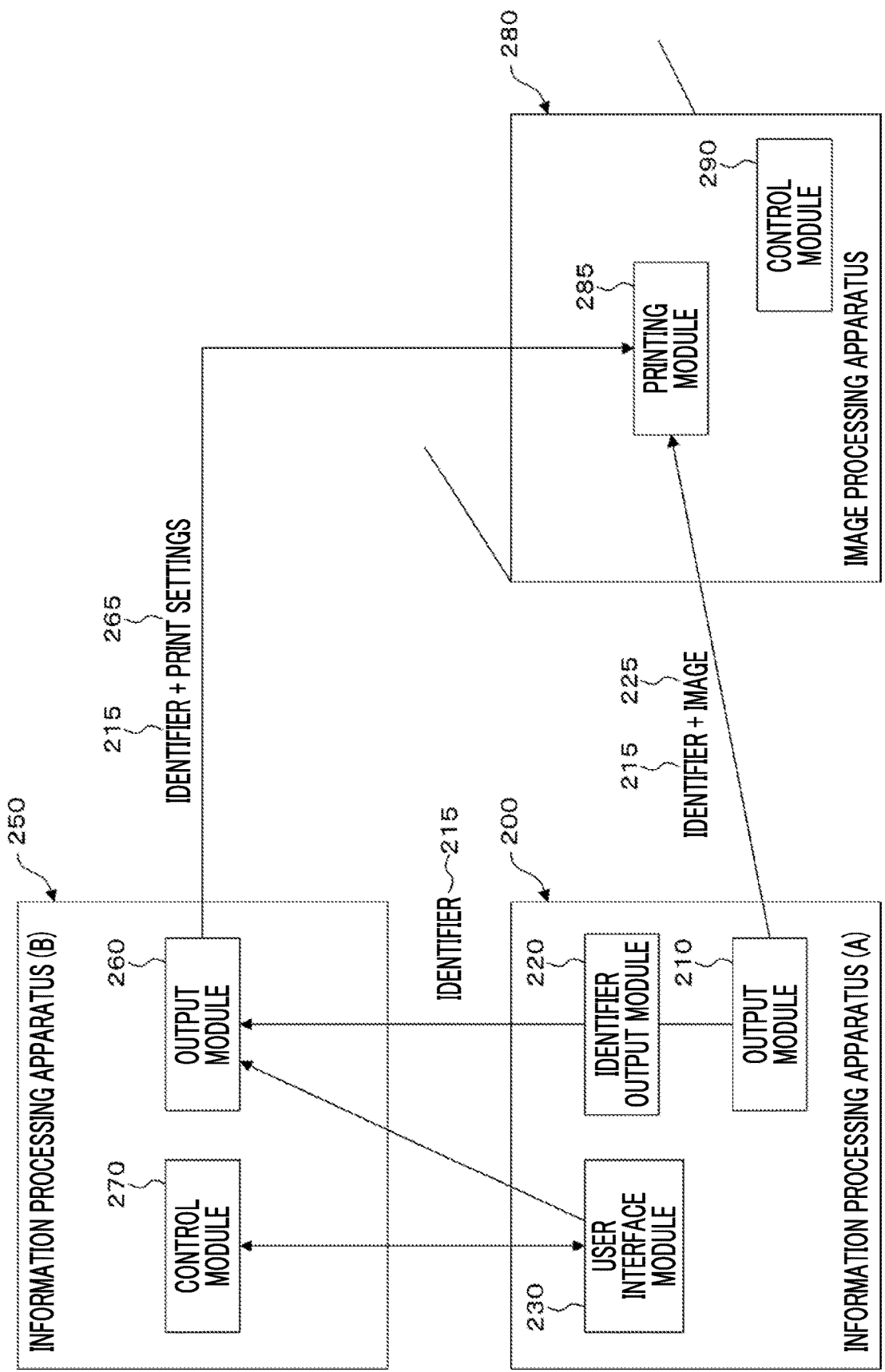
FIG. 2 is a conceptual module configuration diagram illustrating a configuration example according to a second exemplary embodiment.

FIG. 2 is a conceptual module configuration diagram illustrating a configuration example according to a second exemplary embodiment.

Descriptions of similar parts to those in the first exemplary embodiment described in the example of FIG. 1 will not be repeated with a message indicating that the parts are similar to each other. The similar parts will be described below.

The information processing apparatus (A) 200 includes an output module 210, an identifier output module 220, and a user interface module 230. The information processing apparatus (A) 200 is equivalent to the above information processing apparatus 100, is used by the user, and transmits a print instruction to the image processing apparatus 280. The identifier output module 220 and the user interface module 230 are provided instead of the output (B) module 120.

The output module 210 is connected to the identifier output module 220 and the printing module 285 of the image processing apparatus 280. The output module 210, which is a module that performs processing corresponding to the above output (A) module 110, outputs an image 225 to be printed and an identifier 215 to the image processing apparatus 280. The image 225 corresponds to the above image 125, and the identifier 215 corresponds to the above identifier 115.

The identifier output module 220 is connected to the output module 210 and an output module 260 of an information processing apparatus (B) 250. The identifier output module 220 outputs the identifier 215 to the information processing apparatus (B) 250.

Here, the identifier 215 corresponds to the identifier 215 output to the image processing apparatus 280 by the output module 210. Specifically, the identifier 215 is generated by the output module 210.

The user interface module 230 is connected to the output module 260 and a control module 270 of the information processing apparatus (B) 250. The user interface module 230 receives print settings produced by user's operation and transfers the operation result to the output module 260 in accordance with the control by the control module 270.

The user interface module 230 receives a message from the control module 270 and outputs the message to the user. Specifically, the message is used for urging the user, by the control module 270 such that print settings corresponding to the identifier 215 output from the output module 210 are performed.

The user interface module 230 may output, to the control module 270, the date (year, month, day, hour, minute, second, under second order, or any combination thereof) on which the output module 210 outputs a combination of the identifier 215 and the image 225. The control module 270 uses the date to determine whether or not a predetermined period has elapsed from when the output module 210 has performed the output.

For example, a Web browser may be provided as the user interface module 230.

The information processing apparatus (B) 250 includes the output module 260 and a control module 270. The information processing apparatus (B) 250 is capable of communicating with the information processing apparatus (A) 200 and the image processing apparatus 280 via a communication line.

The information processing apparatus (B) 250 may be realized as, for example, a server or a cloud. Thus, even when the output module 260 that receives the print settings is changed, the change may be performed only on the information processing apparatus (B) 250 side, and it is not necessary that the output module 210 that generates an image is not changed in the information processing apparatus (A) 200.

The output module 260 is connected to the identifier output module 220 and the user interface module 230 of the information processing apparatus (A) 200 and the printing module 285 of the image processing apparatus 280. The output module 260 receives the identifier 215 output from the identifier output module 220 of the information processing apparatus (A) 200, receives print settings 265 according to the user's operation, and outputs the print settings 265 and the identifier 215 to the image processing apparatus 280. The output module 260, which is a module corresponding to the output (B) module 120 of the above information processing apparatus 100, is configured to perform processing similarly to the output (B) module 120 using a combination of the output module 260 and the user interface module 230. The print settings 265 correspond to the above print settings 130.

Here, "the user" means a user who uses the information processing apparatus (A) 200 and a person who performs a print instruction. "The print settings 265 by user's operation" are generated, for example, as follows. The output module 260 generates a Web page on which print settings can be made by user's operation, displays the Web page on a Web browser as the user interface module 230, and generates print settings 265 in response to the user's operation on the Web page.

When there is no output from the output module 260 even though a predetermined period has elapsed from when the output module 210 has performed the output, the control module 270 performs control to urge the user to perform print settings corresponding to the identifier 215 output from the output module 210. The control module 270 is a module corresponding to the control module 140 of the information processing apparatus 100 described above. The control module 270 is configured to perform processing together with the user interface module 230 similarly to the control module 140. The date on which the output module 210 outputs the combination of the identifier 215 and the image 225 to the image processing apparatus 280 may be obtained from the user interface module 230. Here, "the user" is a user who is using the information processing apparatus (A) 200 and is a person who is to perform print settings.

The image processing apparatus 280 includes the printing module 285 and a control module 290. The image processing apparatus 280 corresponds to the above image processing apparatus 180.

The printing module 285 is connected to the output module 210 of the information processing apparatus (A) 200 and the output module 260 of the information processing apparatus (B) 250. The printing module 285 receives the image 225 and the print settings 265 output from the output module 210 of the information processing apparatus (A) 200 and the output module 260 of the information processing apparatus (B) 250 and performs printing of the image 225 in accordance with the print settings 265 corresponding to the image 225, by the identifier 215. The printing module 285 corresponds to the above printing module 185. The printing module 185 is different from the printing module 285 in that the printing module 185 receives the combination of the identifier 115 and the print settings 130 from the output (B) module 120 of the information processing apparatus 100 whereas the printing module 285 receives the combination of the identifier 215 and the print settings 265 from the output module 260 of the information processing apparatus (B) 250.

The control module 290 deletes the received image 225 and the received identifier 215, when the print settings 265 and the identifier 215 to be output from the output module 260 of the information processing apparatus (B) 250 are not received even though a predetermined period has elapsed from when the image 225 and the identifier 215 output from the output module 210 of the information processing apparatus (A) 200 have been received. The control module 290 corresponds to the above control module 190.

Figure 3:
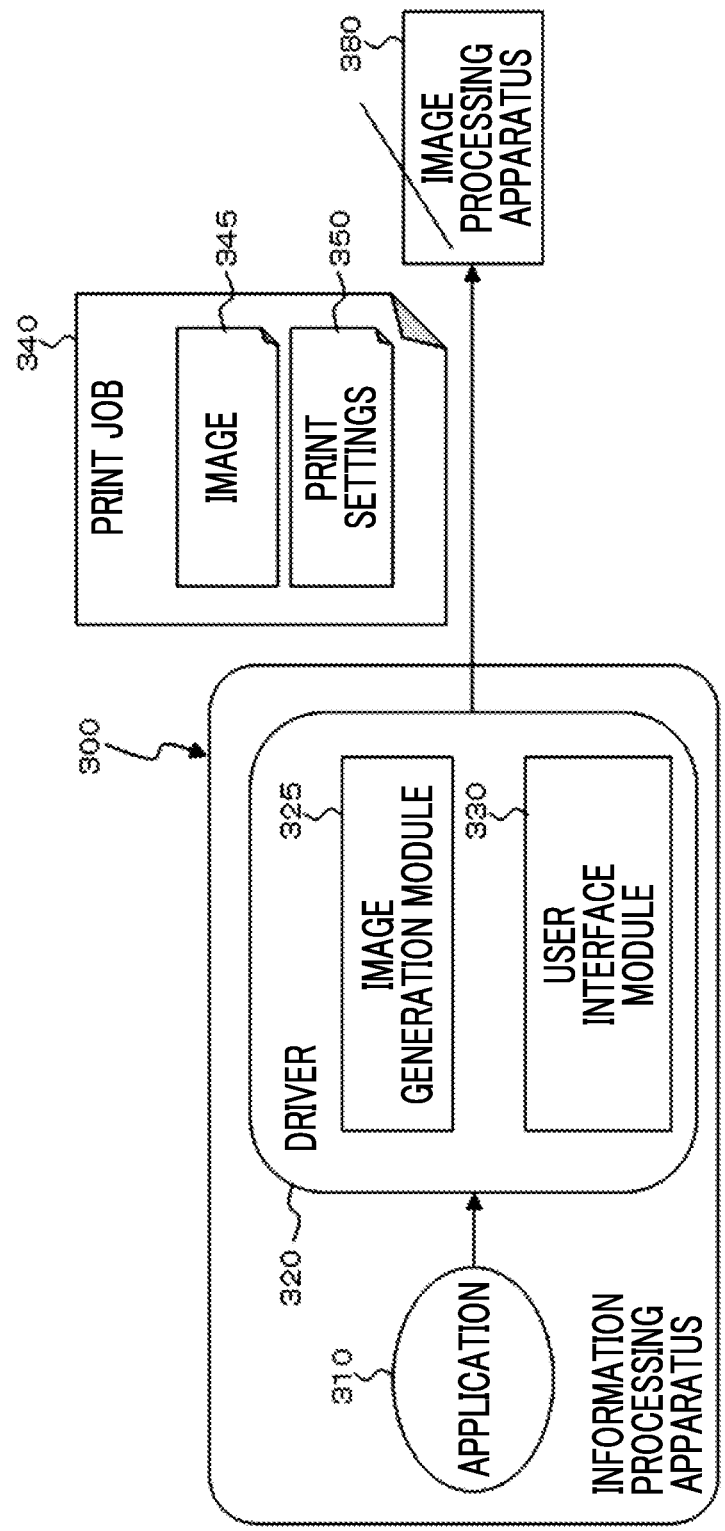
FIG. 3 is a diagram illustrating a printing processing example in the related art.

FIG. 3 is a diagram illustrating a printing processing example in the related art.

An information processing apparatus 300 has an application 310 and a driver 320 for an image processing apparatus 380.

The application 310 is connected to the driver 320. The application 310 transfers a print instruction and a document to be printed, to the driver 320 via an OS. As the application 310, for example, a document creation program and a web browser may be provided.

The driver 320 includes an image generation module 325 and a user interface module 330. That is, the driver 320 includes an integrating the image generation module 325 and the user interface module 330. Thus, it is necessary that the entirety of the driver 320 is reinstalled even when only the image generation module 325 is changed, and is upgraded, for example.

The driver 320 is connected to the application 310 and the image processing apparatus 380. The driver 320 transmits a print job 340 to the image processing apparatus 380.

The image generation module 325 generates an image 345 to be printed by the image processing apparatus 380. This processing is generally referred to as rendering processing.

The user interface module 330 receives the print settings from the user and generates print settings 350 required when printing of the image 345 is performed.

The print job 340 has the image 345 generated by the image generation module 325 and the print settings 350 generated by the user interface module 330. Since the combination of the image 345 and the print settings 350 are provided in one print job 340, the image 345 and the print settings 350 are not separated from each other.

The image processing apparatus 380 is connected to the driver 320 of the information processing apparatus 300 and receives the print job 340 by the driver 320. The image processing apparatus 380 performs printing of the image 345 in accordance with the print settings 350.

The driver 320 that generates the print job 340 can be used by being installed on an OS of the information processing apparatus 300.

The reinstallation work of the driver 320 is a burden on the administrator, and the user also has a burden because the work on the information processing apparatus 300 is stopped.

The driver 320 in the related art is distributed in a form of "a driver package" obtained by integrating plural modules such as the image generation module 325 and the user interface module 330.

Since the OS also manages the driver 320 in a unit of the driver package, even when only some modules in the driver 320 are changed, replacement with the changed modules is not possible. That is, as described above, it is necessary to reinstall the changed module in a replaced package (entirety of the driver 320).

In the exemplary embodiment, the driver 320 which does not require reinstallation even when the user interface module 330 in the driver 320 is changed without changing the current printing architecture (that is, without affecting the OS or the application 310) is provided. In a case where the image processing apparatus 380 is a new model or a new unit such as a post-processing device is added, the user interface module 330 needs to be changed. On the contrary, the image generation module 325 is changed in a few cases.

Figure 4:
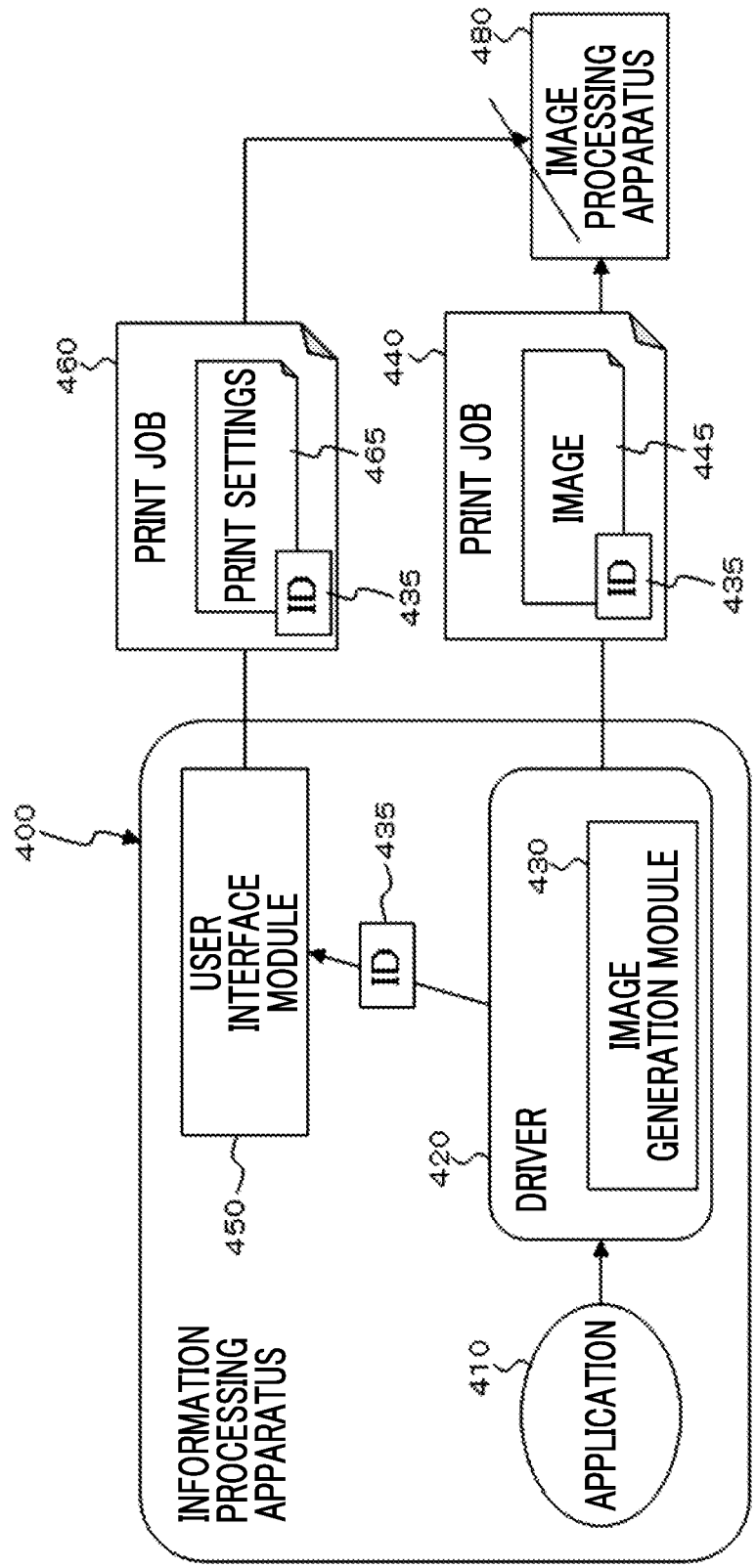
FIG. 4 is a diagram illustrating a printing processing example in the first exemplary embodiment.

FIG. 4 is a diagram illustrating a printing processing example in the first exemplary embodiment.

The information processing apparatus 400 includes an application 410, a driver 420, and a user interface module 450. The information processing apparatus 400 is equivalent to the above information processing apparatus 100.

The application 410 is connected to the driver 420. The application 410 is equivalent to the above application 310.

The driver 420 includes an image generation module 430 and is connected to the application 410, the user interface module 450, and an image processing apparatus 480. The driver 420 transmits a print job 440 to the image processing apparatus 480 and transfers an identifier 435 to the user interface module 450. The image generation module 430 is equivalent to the above output (A) module 110. The identifier 435 is equivalent to the above identifier 115.

The print job 440 includes a combination of the identifier 435 and an image 445. The image 445 is equivalent to the above image 125.

The user interface module 450 is connected to the driver 420 and the image processing apparatus 480, receives the identifier 435 from the driver 420, and transmits a print job 460 to the image processing apparatus 480. The user interface module 450 is equivalent to the above output (B) module 120.

The print job 460 includes a combination of the identifier 435 and print settings 465. The print job 460 is equivalent to the above print settings 130.

The image processing apparatus 480 is connected to the driver 420 and the user interface module 450 in the information processing apparatus 400 to receive the print job 440 from the driver 420 and receive the print job 460 from the user interface module 450. The image processing apparatus 480 is equivalent to the above image processing apparatus 180. The image processing apparatus 480 receives the print job 440 from the driver 420, receives the print job 460 from the user interface module 450, and performs printing of the image 445 in the print job 440 in accordance with the print settings 465 in the print job 460, which form a pair with the identifier 435.

In the configuration example illustrated in FIG. 4, the function of the information processing apparatus 300 described in the example in FIG. 3 is divided into "a component (image generation module 430) that outputs a print job of a print image" and "a component (user interface module 450)) that outputs a print job of a print instruction".

With the print instruction from the application 410, the image generation module 430 outputs the print job 440 to the image processing apparatus 480 and starts (so-called kick) the user interface module 450.

The started user interface module 450 receives a print instruction from the user and outputs the print job 460 to the image processing apparatus 480.

The image processing apparatus 480 combines two print jobs (print job 440 and print job 460) and performs printing.

Figure 5:
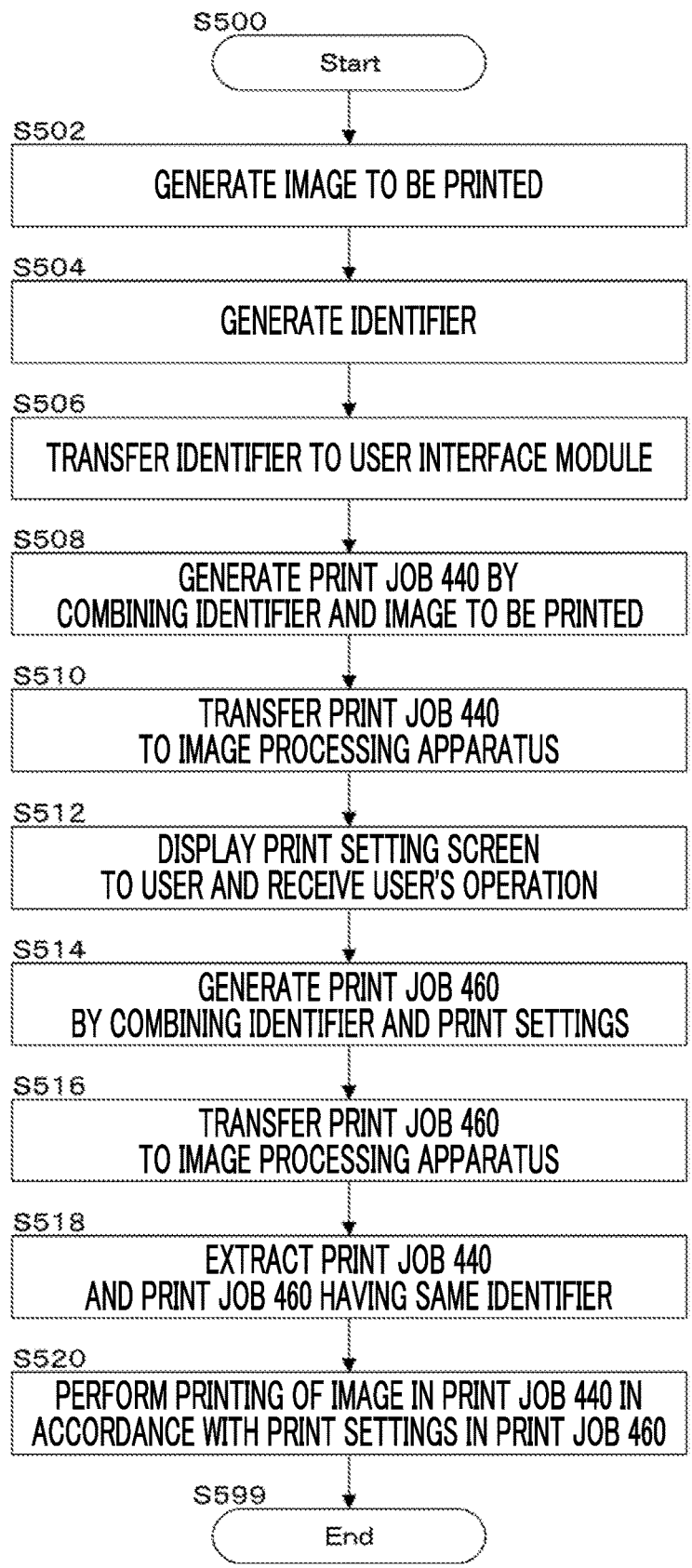
FIG. 5 is a flowchart illustrating a processing example in the first exemplary embodiment.

FIG. 5 is a flowchart illustrating a processing example in the first exemplary embodiment.

In Step S502, the image generation module 430 generates an image 445 to be printed.

In Step S504, the image generation module 430 generates an identifier 435.

In Step S506, the image generation module 430 transfers the identifier 435 to the user interface module 450. The image generation module 430 may transfer information (for example, IP address) indicating the image processing apparatus 480 as a destination of transmission of the print job 440 and transfer the information to the user interface module 450. With such information, the user interface module 450 can specify the image processing apparatus 480 as a destination of transmission of the print job 460.

Figure 6:
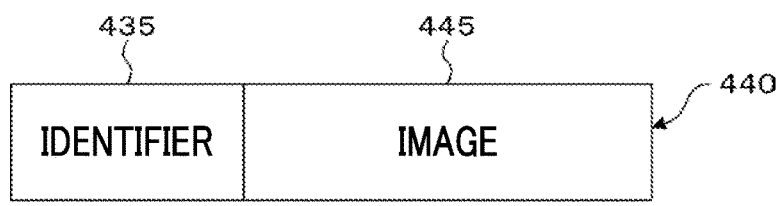
FIG. 6 is a diagram illustrating a data structure example of a print job.

In Step S508, the image generation module 430 generates a print job 440 by combining the identifier 435 and the image 445 to be printed. FIG. 6 is a diagram illustrating an example of the data structure of the print job 440. The print job 440 includes a combination of data on the identifier 435 and data on the image 445.

In Step S510, the image generation module 430 transfers the print job 440 to the image processing apparatus 480.

Figure 9:
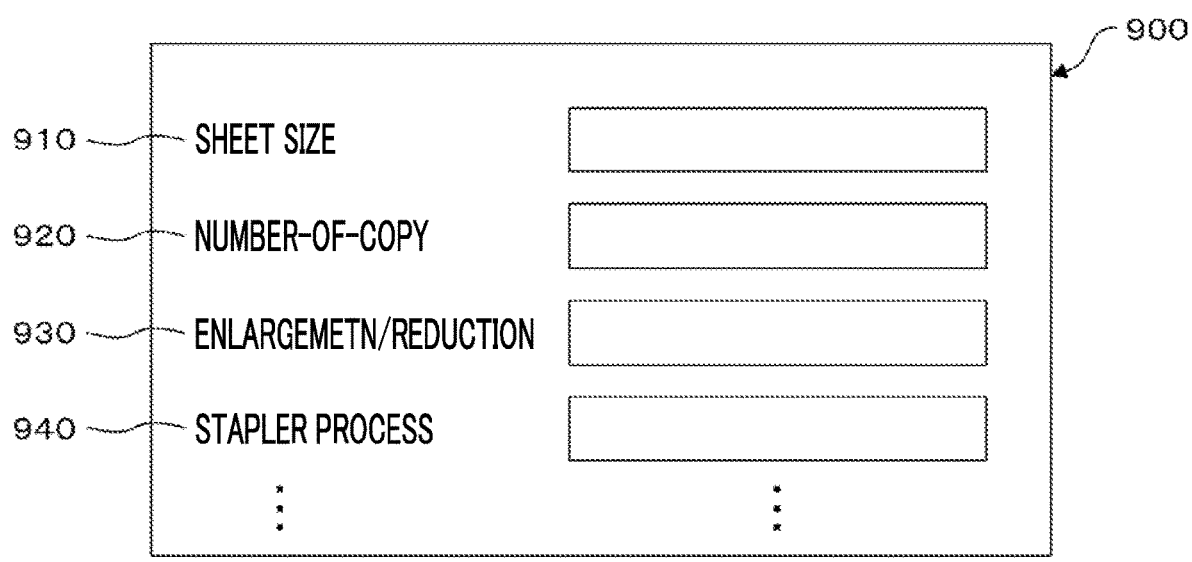
FIG. 9 is a diagram illustrating a display example of a print setting screen.

In Step S512, the user interface module 450 displays a print setting screen for the user and receives the user's operation. For example, a print setting screen 900 allowing the user's operation to be received is displayed on a display device of the information processing apparatus 400. FIG. 9 is a diagram illustrating a display example of the print setting screen 900. A sheet size setting field 910, a number-of-copies setting field 920, an enlargement/reduction setting field 930, a stapler process setting field 940, and the like are displayed on the print setting screen 900. Values set in the sheet size setting field 910, the number-of-copies setting field 920, the enlargement/reduction setting field 930, the stapler process setting field 940, and the like constitute the print settings 465. In addition, setting of double-sided printing and the like may be provided.

Figure 7:
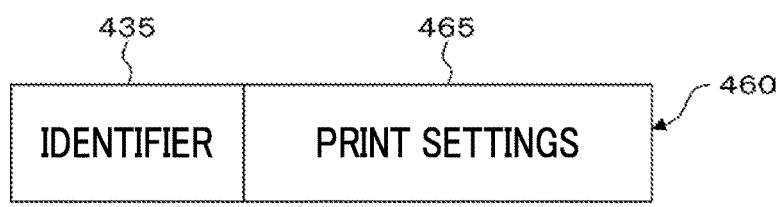
FIG. 7 is a diagram illustrating a data structure example of another print job.

In Step S514, the user interface module 450 generates a print job 460 in which the identifier 435 and the print settings 465 are combined. FIG. 7 is a diagram illustrating a data structure example of the print job 460. The print job 460 includes a combination of the identifier 435 and the print settings 465.

In Step S516, the user interface module 450 transfers the print job 460 to the image processing apparatus 480.

Figure 8:
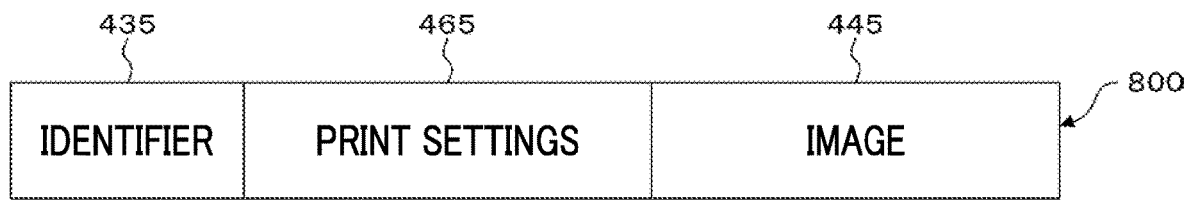
FIG. 8 is a diagram illustrating a data structure example of still another print job.

In Step S518, the image processing apparatus 480 extracts the print job 440 and the print job 460 having the same identifier 435. Then, a print job 800 is generated. FIG. 8 is a diagram illustrating a data structure example of the print job 800. The print job 800 includes a combination of the identifier 435, the print settings 465, and the image 445. The combination of the print settings 465 and the image 445 is equivalent to a print job (print job 340 described in the example of FIG. 3) in the related art.

In Step S520, the image processing apparatus 480 performs printing of the image 445 in the print job 440 in accordance with the print settings 465 in the print job 460.

Figure 10:
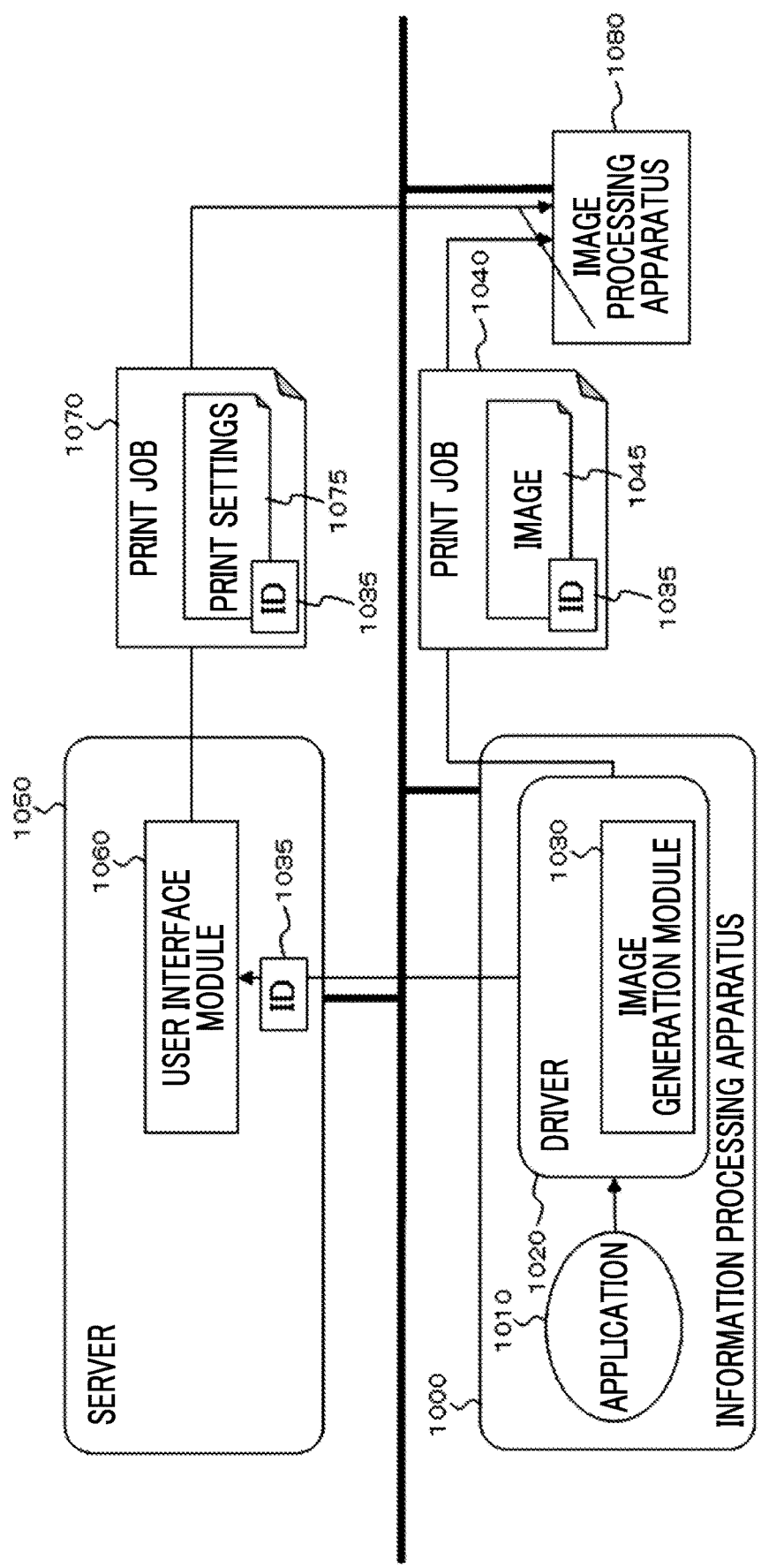
FIG. 10 is a diagram illustrating a printing processing example in the second exemplary embodiment.

FIG. 10 is a diagram illustrating a printing processing example in the second exemplary embodiment.

An information processing apparatus 1000, a server 1050, and an image processing apparatus 1080 are connected to each other via a communication line. The information processing apparatus 1000 is equivalent to the above information processing apparatus (A) 200. The server 1050 is equivalent to the above information processing apparatus (B) 250. The image processing apparatus 1080 is equivalent to the above image processing apparatus 280. The server 1050 may be used by plural information processing apparatuses 1000. That is, a user interface module 1060 is shared by the plural information processing apparatuses 1000. In the configuration described in the example of FIG. 3 in the related art, the driver 320 needs to be updated for each information processing apparatus 300. However, in the configuration described in the example of FIG. 10, the user interface module 1060 used by the plural information processing apparatuses 1000 is updated by a one-file replacement operation.

The information processing apparatus 1000 includes an application 1010 and a driver 1020.

The application 1010 is connected to the driver 1020. The application 1010 is equivalent to the application 310 described above.

The driver 1020 includes an image generation module 1030 and is connected to the application 1010, the user interface module 1060 of the server 1050, and the image processing apparatus 1080. The driver 1020 transmits a print job 1040 to the image processing apparatus 1080 and transmits an identifier 1035 to the server 1050. The image generation module 1030 is equivalent to the above output module 210. The identifier 1035 is equivalent to the identifier 215 described above.

The print job 1040 includes a combination of the identifier 1035 and an image 1045. The image 1045 is equivalent to the image 225 described above.

The server 1050 includes a user interface module 1060. The user interface module 1060 is equivalent to the above output module 260.

The user interface module 1060 is connected to the driver 1020 of the information processing apparatus 1000 and the image processing apparatus 1080 and transmits a print job 1070 to the image processing apparatus 1080.

The print job 1070 includes a combination of the identifier 1035 and print settings 1075. The print settings 1075 are equivalent to the print settings 265 described above.

The image processing apparatus 1080 is connected to the driver 1020 of the information processing apparatus 1000 and the user interface module 1060 of the server 1050 so as to receive the print job 1040 from the driver 1020 and receive the print job 1070 from the user interface module 1060. The image processing apparatus 1080 is equivalent to the above image processing apparatus 280. The image processing apparatus 1080 receives the print job 1040 from the driver 1020, receives the print job 1070 from the user interface module 1060, and performs printing of the image 1045 in the print job 1040 in accordance with the print settings 1075 in the print job 1070, which form a pair with the identifier 1035.

FIG. 11 is a flowchart illustrating a processing example in the second exemplary embodiment.

In Step S1102, the information processing apparatus 1000 generates an image 1045 to be printed.

In Step S1104, the information processing apparatus 1000 generates an identifier 1035.

In Step S1106, the information processing apparatus 1000 transmits the identifier 1035 to the server 1050. The server 1050 performs the process of Step S1152.

In Step S1108, the information processing apparatus 1000 generates a print job 1040 by combining the identifier 1035 and the image 1045 to be printed.

In Step S1110, the information processing apparatus 1000 transmits the print job 1040 to the image processing apparatus 1080. The image processing apparatus 1080 performs the process of Step S1182.

In Step S1112, the information processing apparatus 1000 displays a print setting screen on a Web browser.

In Step S1114, the information processing apparatus 1000 receives a user's operation regarding print settings, on the Web browser and transmits the operation to the server 1050. The server 1050 performs the process of Step S1156.

In Step S1152, the server 1050 receives the identifier 1035 from the information processing apparatus 1000.

In Step S1154, the server 1050 generates a Web page of the print setting screen and transmits the Web page to the information processing apparatus 1000. The information processing apparatus 1000 performs the process of Step S1112.

In Step S1156, the server 1050 receives print settings from the information processing apparatus 1000.

In Step S1158, the server 1050 generates the print job 1070 in which the identifier 1035 and the print settings 1075 are combined.

In Step S1160, the server 1050 transmits the print job 1070 to the image processing apparatus 1080. The image processing apparatus 1080 performs the process of Step S1184.

In Step S1182, the image processing apparatus 1080 receives the print job 1040 from the information processing apparatus 1000.

In Step S1184, the image processing apparatus 1080 receives the print job 1070 from the server 1050.

In Step S1186, the image processing apparatus 1080 extracts the print job 1040 and the print job 1070 having the same identifier 1035.

In Step S1188, the image processing apparatus 1080 performs printing of the image 1045 in the print job 1040 in accordance with the print settings 1075 in the print job 1070.

FIG. 12 is a diagram illustrating a printing processing example according to a modification example of the second exemplary embodiment.

A connection between the information processing apparatus 1000 and a cloud apparatus 1250 and a connection between the image processing apparatus 1080 and the cloud apparatus 1250 are made via a communication line and a firewall 1290. The server 1050 described in the example of FIG. 10 is set as the cloud apparatus 1250.

The information processing apparatus 1000, the image processing apparatus 1080, and the cloud apparatus 1250 are connected to each other via the communication line. The information processing apparatus 1000 and the image processing apparatus 1080 communicate with the cloud apparatus 1250 via the firewall 1290.

The information processing apparatus 1000 includes an application 1010 and a driver 1020.

The application 1010 is connected to the driver 1020.

The driver 1020 includes the image generation module 1030, is connected to the application 1010 and the image processing apparatus 1080, and is connected to a user interface module 1060 of the cloud apparatus 1250 via the firewall 1290. The driver 1020 transmits the print job 1040 to the image processing apparatus 1080.

The image generation module 1030 may have storage location information (for example, file path) of the user interface module 1060 as setting information. Thus, the administrator or the user may switch the storage location information and call any user interface module 1060.

The cloud apparatus 1250 includes the user interface module 1060. The cloud apparatus 1250 has functions equivalent to those of the server 1050.

The user interface module 1060 is connected to the driver 1020 of the information processing apparatus 1000 and the image processing apparatus 1080 via the firewall 1290 and transmits the print job 1070 to the image processing apparatus 1080.

The image processing apparatus 1080 is connected to the driver 1020 of the information processing apparatus 1000, and is connected to the user interface module 1060 of the cloud apparatus 1250 via the firewall 1290. Thus, the image processing apparatus 1080 receives the print job 1040 from the image generation module 1030 and receives the print job 1070 from the user interface module 1060.

In a case of the configuration described in the example of FIG. 10 or 12, each of the image generation module 1030 and the user interface module 1060 includes version information. Thus, in a case where the versions do not coincide with each other or in a case of a version having no functional compatibility relation, it is not possible to normally continue processing.

At a timing of Step S1152, the user interface module 1060 may check versions of the image generation module 1030 and the user interface module 1060. In a case of a combination with which it is not possible to normally continue processing, an error may be displayed, and the processing may be stopped.

The image generation module 1030 may include plural pieces of storage location information of the user interface module 1060. That is, plural user interface modules 1060 may be provided. In this case, as described above, when a combination of the image generation module 1030 and the user interface module 1060, with which it is not possible to normally continue processing, is obtained, the processing may continue in a manner that the next user interface module 1060 (another user interface module 1060) is caused to perform the process of Step S1152.

Figure 13:
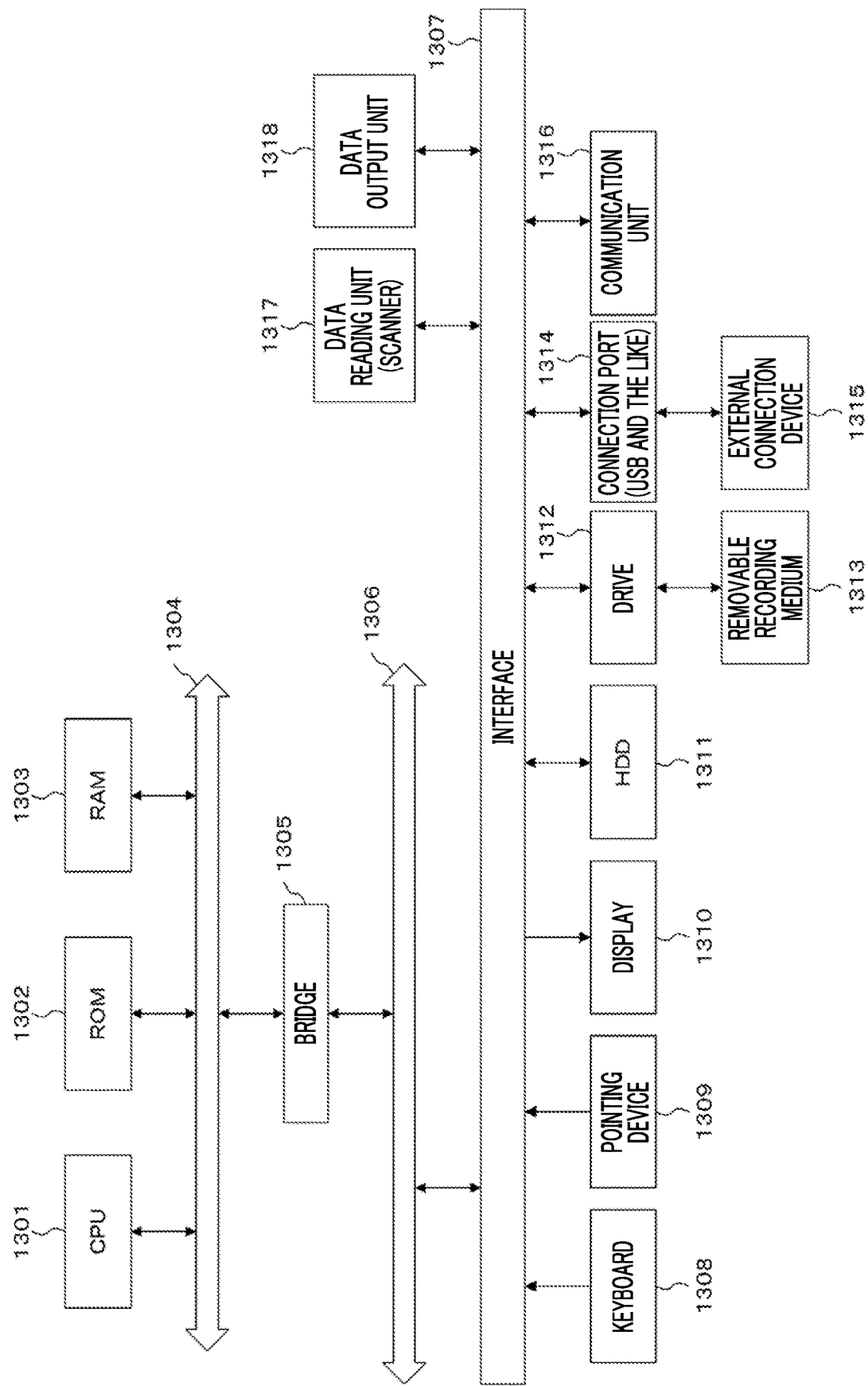
FIG. 13 is a block diagram illustrating a hardware configuration example of a computer that embodies the exemplary embodiment.

With reference to FIG. 13, a hardware configuration example of the information processing apparatus 100, the image processing apparatus 180, the information processing apparatus (A) 200, the information processing apparatus (B) 250, the image processing apparatus 280, the information processing apparatus 400, the image processing apparatus 480, the information processing apparatus 1000, the server 1050, and the image processing apparatus 1080 in the exemplary embodiment will be described. The configuration illustrated in FIG. 13 includes a personal computer, for example. FIG. 13 illustrates a hardware configuration example including a data reading unit 1317 such as a scanner and a data output unit 1318 such as a printer.

A central processing unit (CPU) 1301 is a control unit that performs processing in accordance with a computer program in which execution sequences of the various modules described in the above exemplary embodiment, that is, the output (A) module 110, the output (B) module 120, the control module 140, the printing module 185, the control module 190, the output module 210, the identifier output module 220, the control module 240, the output module 260, the printing module 285, the control module 290, the application 410, the driver 420, the image generation module 430, the user interface module 450, the application 1010, the driver 1020, the image generation module 1030, and the user interface module 1060 are described.

A read only memory (ROM) 1302 stores a program used by the CPU 1301, operation parameters, and the like. A random access memory (RAM) 1303 stores a program used in execution of the CPU 1301 and parameters and the like appropriately changed in the execution. The ROM 1302 and the RAM 1303 are connected to each other by a host bus 1304 configured from a CPU bus and the like.

The host bus 1304 is connected to an external bus 1306 such as a peripheral component interconnect/interface (PCI) bus via a bridge 1305.

A keyboard 1308 and a pointing device 1309 such as a mouse are devices operated by an operator. A display 1310 is, for example, a liquid crystal display device or a cathode ray tube (CRT) and displays various kinds of information as text or image information. A touch screen or the like including functions of both the pointing device 1309 and the display 1310 may be used. In that case, regarding realization of the function of the keyboard, the function of the keyboard may be realized by drawing a keyboard (also referred to as so-called a software keyboard, a screen keyboard, and the like) on a screen (for example, touch screen) with software without a physical connection as with the keyboard 1308.

A hard disk drive (HDD) 1311 has a hard disk (may be a flash memory or the like in addition to the hard disk) mounted therein, and drives the hard disk to record or reproduce a program and information to be executed by the CPU 1301. The HDD 1311 stores print settings, images, result data of processing by each module, and the like, which are received by user's operation. In addition, various kinds of data, various computer programs, and the like are stored in the HDD 1311.

A drive 1312 reads data or a program recorded in a removable recording medium 1313 such as a magnetic disk, an optical disk, a magneto-optical disk, or a semiconductor memory, which are mounted in the drive. The drive 1312 supplies the data and the program to the RAM 1303 connected via an interface 1307, an external bus 1306, a bridge 1305, and a host bus 1304. The removable recording medium 1313 can also be used as a data recording area.

A connection port 1314 is a port for connecting an external connection device 1315 and includes a connection unit of USB, IEEE1394, and the like. The connection port 1314 is connected to the CPU 1301 and the like via the interface 1307, the external bus 1306, the bridge 1305, the host bus 1304, and the like. A communication unit 1316 is connected to the communication line and performs data communication processing with an external device. The data reading unit 1317 is a scanner, for example, and performs processing of reading a document. The data output unit 1318 is a printer, for example, and performs processing of outputting document data.

In the above exemplary embodiment, regarding a case of being realized by a computer program, the above exemplary embodiment is realized by causing a system of the hardware configuration to read a software computer program and causing the hardware to cooperate with software resources.

The hardware configuration of the information processing apparatus 100 or the like illustrated in FIG. 13 is one configuration example. The exemplary embodiment is not limited to the configuration illustrated in FIG. 13, and any configuration may be provided so long as the modules described in the exemplary embodiment can be performed. For example, some modules may include dedicated hardware (for example, an application specific integrated circuit (as a specific example, there is an application specific integrated circuit (ASIC) or a reconfigurable integrated circuit (as a specific example, there is a field-programmable gate array (FPGA). A form in which some modules are connected to a communication line in an external system may be made. Further, plural systems illustrated in FIG. 13 may be connected to each other via a communication line and cooperate with each other. In particular, in addition to the personal computer, incorporation with portable information communication devices, home information appliances, robots, copiers, fax machines, scanners, printers, multifunction machines, and the like may be performed.

The program described above may be provided in a state of being stored in a recording medium. The program may be provided by communication means. In this case, for example, the above program may be regarded as an invention of "a computer-readable recording medium storing a program".

"The computer-readable recording medium having a program recorded therein" refers to a computer-readable recording medium having a program recorded therein, which is used for installing, executing, and distributing the program, for example.

Examples of the recording medium include "DVD-R, DVD-RW, DVD-RAM, and the like" which belong to a digital versatile disc (DVD) and are standards formulated by the DVD Forum, "DVD+R, DVD+RW, and the like" formulated by DVD+RW standards, read only memories (CD-ROM), CD recordable (CD-R), CD rewriteable (CD-RW), and the like being compact discs (CD), Blu-ray (registered trademark) discs, magneto-optical disks (MO), flexible disks (FD), magnetic tapes, hard disks, read only memories (ROM), electrically erasable and rewritable read only memories (EEPROM (registered trademark)), flash memories, random access memories (RAM), and secure digital (SD) memory cards.

The entirety or a portion of the program may be preserved or distributed in a state of being recorded on the recording medium. Regarding communication, for example, a wired network or a wireless communication network used in a local area network (LAN), a metropolitan area network (MAN), a wide area network (WAN), the Internet, an intranet, an extranet or transmission using a transmission medium such as a combination thereof may be provided, and carrying on a carrier wave may be performed.

The program may form part or all of another program or may be recorded on a recording medium along with another program. The program may be recorded by being divided into plural recording media. The program may be recorded in any form such as compression or encryption as long as the program can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
a first information processing apparatus;
a second information processing apparatus; and
an image processing apparatus,
the first information processing apparatus including:
   a first output section that outputs, to the image processing apparatus, an image to be printed and identification information; and
   a second output section that outputs the identification information to the second information processing apparatus,
the second information processing apparatus including:
   a third output section that receives the identification information output from the second output section, receives print settings from a user, and outputs the print settings and the identification information to the image processing apparatus,
the image processing apparatus including:
   a printing section that receives the image and the print settings output from the first output section and the third output section and performs printing of the image in accordance with the print settings for the image using the identification information.

2. The image processing system according to claim 1, wherein
the second information processing apparatus further includes a control section that performs control to urge the user to perform print settings corresponding to the identification information output from the first output section when there is no output from the third output section even though a predetermined period has elapsed from when the first output section has performed output.

3. The image processing system according to claim 1, wherein
the image processing apparatus further includes a control section that deletes the received image and the received identification information when the print settings and the identification information to be output from the third output section are not received even though a predetermined period has elapsed from when the image and the identification information output from the first output section have been received.

4. An image processing system comprising:
an information processing apparatus; and
an image processing apparatus,
the information processing apparatus including:
   a first output section that outputs, to the image processing apparatus, identification information and an image to be printed; and
   a second output section that receives print settings from a user and outputs the print settings and the identification information to the image processing apparatus,
the image processing apparatus including:
   a printing section that receives the image, the print settings, and the identification information output from the first output section and the second output section and performs printing of the image in accordance with the print settings for the image using the identification information, wherein
the information processing apparatus further includes a control section that performs control to urge the user to perform print settings corresponding to the identification information output from the first output section when there is no output from the second output section even though a predetermined period has elapsed from when the first output section has performed output.

5. An image processing system comprising:
an information processing apparatus; and
an image processing apparatus,
the information processing apparatus including:
   a first output section that outputs, to the image processing apparatus, identification information and an image to be printed; and
   a second output section that receives print settings from a user and outputs the print settings and the identification information to the image processing apparatus,
the image processing apparatus including:
   a printing section that receives the image, the print settings, and the identification information output from the first output section and the second output section and performs printing of the image in accordance with the print settings for the image using the identification information, wherein
the image processing apparatus further includes a control section that deletes the received image and the received identification information when the print settings and the identification information to be output from the second output section are not received even though a predetermined period has elapsed from when the image and the identification information output from the first output section have been received.

* * * * *